Patented June 24, 1947

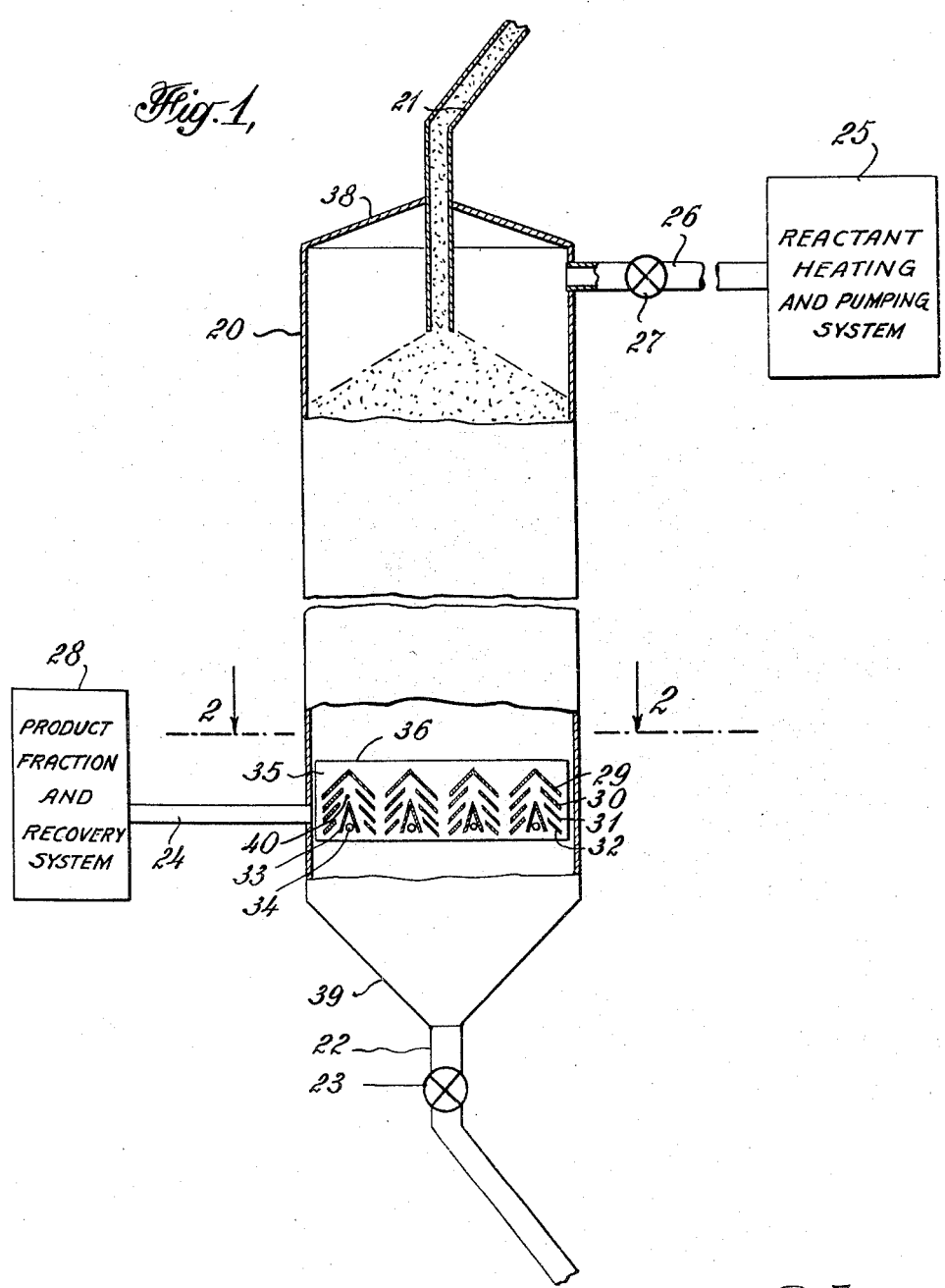

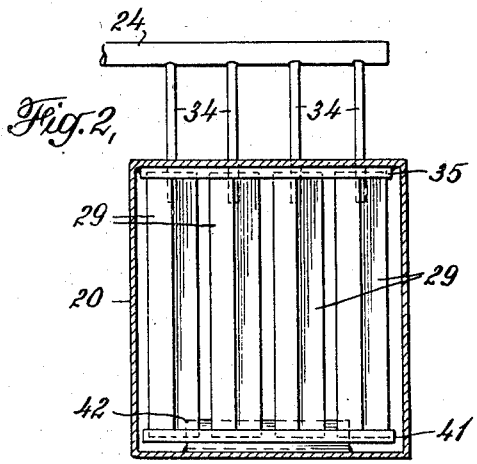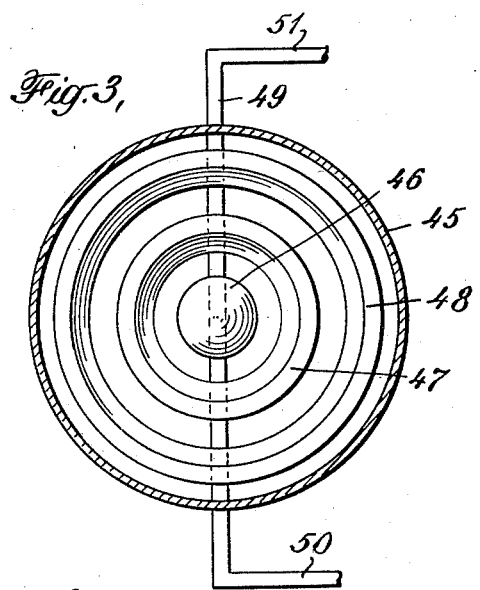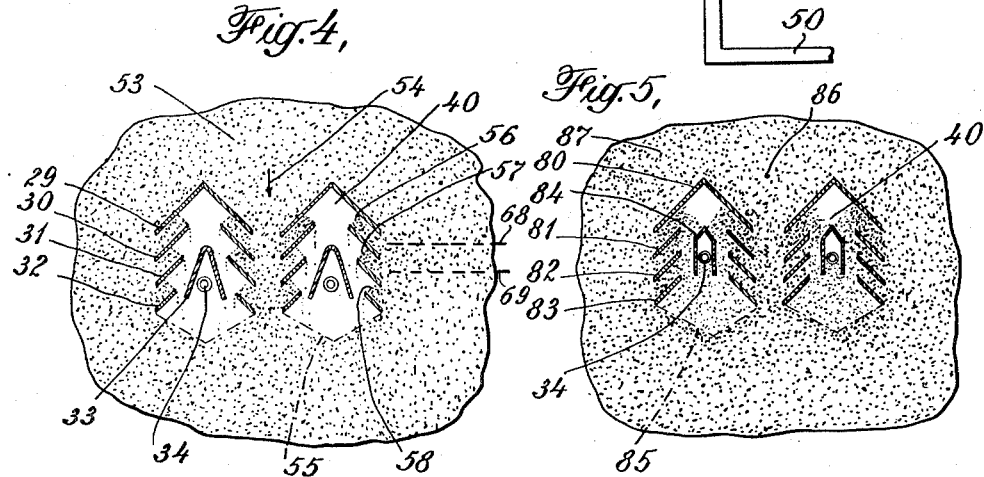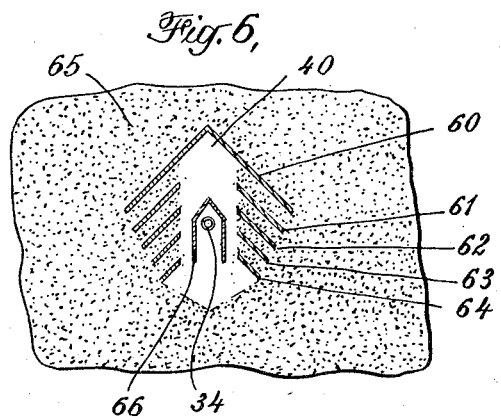

2,423,013

UNITED STATES PATENT OFFICE 2,423,013

METHOD AND APPARATUS FOR CONTACTING GASES WITH PARTICLE FORM SOLID MATERIALS

Louis P. Evans, Woodbury, N. J., assignor to Socony-Vacuum Oil Company, Incorporated, a corporation of New York Application September 6, 1944, Serial No. 552,828

16 Claims. (Cl. 196—52)

This invention in general has to do with a method and apparatus for continuously contacting gases with particle form solid material for any of a number of purposes such as gas separation by adsorption, heat exchange, gaseous conversion or solid material treating. An exemplary and very important process is the cracking conversion of hydrocarbons, it being well known that hydrocarbons of a gas-oil nature boiling between about 500° F. and about 750° F. may be converted to gasoline and other products by passing them at reaction conditions of temperature and pressure such as, for example, temperatures of the order of 875° F. at pressures somewhat above atmospheric in contact with a solid adsorptive catalytic contact mass. Such contact masses are often particle in form and may partake of the nature of natural or treated clays, relatively inert carriers upon which catalytic constituents have been deposited or various synthetic associations of alumina, silica or alumina and silica, any of which may or may not have other constituents added such as certain metallic oxides.

In a most recent form, the operation has been developed as one in which the particle form solid contact mass material is moved cyclically through two zones in the first of which it is subjected to reaction and in the second of which it is subjected to the action of a gaseous regeneration medium, such as air, acting to burn off contaminant materials deposited upon the contact mass during reaction. The flow of solid material is so controlled as to permit it to pass through each vessel as a substantially compact column of downwardly moving particle form material.

This invention is specifically directed to a method and apparatus for removing gas from reactors and regenerators of processes of this type, after such gas has been contacted with a moving stream of particle form solid contact mass material.

Heretofore in such processes it has been the general practice to pass the particle form contact material downwardly through vertical reactor and regenerator vessels as substantially compact columns of such material. The reaction or regenerator gases are introduced near the lower end of said vessels and passed upwardly through the reaction zones countercurrently to the direction of solid flow and withdrawn adjacent the upper end of said vessels above the surface of the contact material column therein. Unless baffling is used within such vessels so as to provide for sheltered passageways for gas flow through such vessels, the maximum allowable rate of gas flow therethrough is limited to that which would cause serious boiling of the solid or disruption of the downwardly moving column of said solid within the vessel. When the contact material particles are of relatively small size or low density, this limitation or allowable rate of gas flow becomes very serious. Moreover, even when baffling is used within the vessel the gas flow therethrough is limited to that which will cause a pressure drop per vertical foot of flow which is sufficient to cause boiling of the solid material. Although the baffling may be so designed as to permit passage of gas through the reaction zones at desired rates, it has been found that substantially more efficient utilization of a given volume of reaction zone and more efficient gaseous conversion may be obtained by passing gases directly through beds or columns of particle form material rather than through baffled passageways distributed therethrough.

In order to permit better understanding of the above and following discussion, some consideration should now be given to what is meant by contact material boiling. It is characteristic of any accumulation of particle form solid material to tend to form a surface sloping with the horizontal. The slope of the surface will vary depending upon the nature of the solid material and this slope is called the angle of repose of the solid. For granular material of the type of fuller's earth the angle of repose may be in the order of 30 to 40 degrees. If gas is passed upwardly through an accumulation of such solid material and permitted to disengage from the surface thereof and if the rate of such gas flow is gradually increased, a rate of gas flow will be reached at which turbulence occurs within the solid material accumulation and some solid is thrown up from the surface. The surface will no longer form a slope with the horizontal but will flatten out and may rise. Also considerable turbulence of the solid material will occur within the accumulation resulting in gas channeling and other difficulties. This condition is termed boiling of the solid material. Likewise if an inverted gas outlet channel be placed within a confined column of downwardly flowing particle form solid material, a surface will be formed directly below the channel from which gas may disengage from the solid. If the gas rate is sufficient to cause boiling of the solid, the solid material surface will rise up within the channel. It is with the above meanings that the term boiling of particle form solid material, or its equivalent, will be used in discussing and claiming this invention.

It has been found that if gas is passed downwardly through reaction or regeneration vessels concurrently with the direction of particle form solid material therethrough, the above limitations on maximum rate of gas flow would no longer apply, but this is true only as long as the direction of gas flow is downward; and a serious difficulty arises at the location of gas-solid disengagement and gas withdrawal within such arrangements. Two methods of gas withdrawal from such an apparatus suggest themselves, either the provision of a restraining screen between the gas outlet conduits and the column of material within the vessels or the provision of baffling of a type which will provide substantially solid free zones into which the gas may rise and be withdrawn after its disengagement from the surface of the solid material directly below such zones. The use of screens of sufficiently small mesh size to restrain the particle form solid material from being swept from the reaction vessel along with the effluent gas has been found impractical because the screens gradually become plugged, thereby preventing gas flow therethrough without excessive pressure drops. The use of baffles is exemplified by the use of a row of inverted spaced channels within the lower section of a reaction vessel. In order for gas to enter under these baffles, its direction of flow must change from downward to upward or diagonally upward through the particle form solid material directly below such channels. Inasmuch as the gas-solid disengagement surfaces thus formed are not even of as great a cross-section as the column of said solid material in the vessel thereabove, it will become apparent that the solid material will be boiled by excessive gas rates under the outlet channels causing such solid to rise up under the channels from which it will be swept out of the vessel by effluent gas. Thus the maximum allowable gas flow is limited in such a construction by the rate which will cause solid material boiling under the gas outlet channels. This maximum may be even less than that permitted in countercurrent type operation.

The provision of a suitable method and apparatus for withdrawing gas which would avoid the above difficulties is of considerable importance. With such a provision, the use of reaction and regeneration vessels wherein the particle form solid and the reaction gas are passed concurrently downward through the reaction zone permits operations not heretofore practically possible in the countercurrent type of vessels. Much greater flexibility of range of gas flow would become possible, permitting in many cases much higher daily yields of gasoline product for units of given size. Moreover, the necessity for gas passage forming baffles within the reaction zones, now required in some installations due to the resistance to gas flow therethrough of contact material of very small particle size would be eliminated. The use of longer reaction zones of smaller cross-section, which are desirable in certain instances would also be made possible.

A major object of this invention is the provision of a method and apparatus wherein gas may be passed at a high rate downwardly through a substantially compact column of downwardly moving particle form solid material and subsequently withdrawn therefrom without substantial entrainment of the particle form solid material.

A specific object of this invention is the provision in a process wherein gases are passed concurrently downwardly through substantially compact columns of downwardly flowing particle form solid material of a method and apparatus for uniform removal of the effluent gas from said column of particle form solid material without serious disruption of said column or removal of said particle form solid in the effluent gas.

Another important object is the provision of a method and apparatus wherein hydrocarbon vapors and a particle form contact mass material may be passed concurrently downward through the reaction zone of a vessel and separated adjacent the lower end of said vessel without serious removal of the contact mass material with the effluent reactant.

These and other objects will become apparent in the ensuing discussion of this invention.

The invention may be more readily contemplated from consideration of the drawings attached to this specification, Figure 1 of which shows in diagrammatic form, a conversion vessel adapted for downwardly concurrent flow of reactant gases and particle form solid contact mass material through a reaction zone followed by separation thereof without substantial entrainment of the solid in the effluent gas. Figure 2 is a sectional view taken at line 2—2 of Figure 1. Figure 3 is a plan view, in section, showing an arrangement of the baffles of this invention in a vessel of circular cross-section. Figure 4 is an enlarged diagrammatic view of part of the gas outlet arrangement shown in Figure 1. Figure 5 is a diagram used in the explanation. Figure 6 is a diagrammatic view of a modified baffle arrangement and Figure 7 is a diagrammatic view of another modified arrangement for disengagement and withdrawal of gas. All of these drawings are highly diagrammatic in form.

Turning now to Figure 1, we find in highly diagrammatic form a hydrocarbon conversion vessel 20 with reactant stock preparation system 25 and product fractionation and recovery system 28. Connected through the top 38 of the conversion vessel 20 and extending a short distance therewithin is the solid material inlet conduit 21. At the lower end of the vessel 20 is the tapered drain section 39 to the lower end of which is connected the solid material outlet 22. On said outlet conduit is provided a throttle valve 23 for control of solid material flow therethrough. Although only one inlet and one outlet conduit are shown in this drawing, several such inlet and outlet conduits may be used, if desired.

Within the lower end of the vessel 20 and extending thereacross in a direction perpendicular to the plane of the drawing are the uniformly spaced inverted angles 29 which are supported on the ends shown by plate 35 welded at 36 to the shell of vessel 20. Further details on the support of these angles will be given hereinafter. Below each side of each of these angles are similarly supported vertically spaced plate baffles 30, 31 and 32 which are of progressively decreasing width the lower their position below the angles 29, and are positioned roughly parallel to the sides of the angles 29 thereabove both as regards to width and length. These baffles are of such limited width as to provide a zone 40 below each angle 29 and extending the length thereof from which direct gravity flow of the solid material passing through vessel 20 is excluded. Within each of these zones 40 is positioned an inverted angle shaped gas collector member 33, which extends substantially across the vessel width. The arrangement may be better understood by reference to Figure 2 in conjunction with Figure 1. In Figure 2 is shown a plan view taken at line 2—2 of Figure 1, looking down on the angles 29 within the vessel 20. It will be seen that the angles 29 extend only part way through the support plate 35 so that the plate 35 also serves to close the ends of the entire baffle arrangement thereby preventing solid material from flowing into the zones 40 from the ends thereof. Likewise, the angles 29 are supported on their opposite ends by plate 41 which differs from plate 35 in that the plate 41 is supported by the angle 42 thereunder which, in turn, is connected to the vessel shell. Thus the plate 41 may slide on the support angle 42 thereby providing for expansion of the angles 29 due to temperature changes. The plate baffles 30, 31 and 32 and the collector angles 33 are not shown in Figure 2 for the sake of simplicity, but these are similarly supported on their ends by plates 35 and 41. Connected through the shell of vessel 20 and the plate 35 and extending a short way under the collector angles 33 are the gas outlet conduits 34. These conduits are manifolded on their opposite ends into conduit 24 through which the effluent gas passes to the product fractionation and recovery system, which is of conventional design.

In operation, particle form solid contact mass material is introduced into the upper end of the conversion vessel 20 through inlet conduit 21 and permitted to pass downwardly therethrough as a substantially compact column of solid material. The contact material flows downwardly through the spaces between the spaced baffle arrangements in the gas disengaging and outlet section of the convertor and finally passes from the bottom of the vessel 20 through conduit 22 and flow throttling valve 23 which conduct it to a suitable conveyor (not shown) by which it is conveyed to a suitable regenerator (not shown) wherein contaminant deposited upon the contact material during the hydrocarbon conversion in vessel 20 is removed. The regenerated contact material is then conducted to the inlet end of conduit 21 for re-use in the conversion vessel 20. Hydrocarbon charging stock is vaporized and heated to the desired reaction temperatures in the heating system 25, which is of conventional design, and then passed through conduit 26 and valve 27 into the upper end of the conversion vessel above the top of the column of contact material therein. The reactant gas then passes downwardly through the column of contact material in vessel 20, and into the zones 40 within the lower end of the vessel by way of the spaces between angles 29 and plate baffles 30 and between the subsequent plate baffles 31 and 32 and the open space directly below these baffle arrangements. As will be shown hereinafter in detail solid material surfaces are formed at all these locations from which the gas may disengage before entering zones 40. The total cross sectional area of these surfaces is in excess of that of the contact material column within the vessel 20 thereabove to such an extent as to permit gas-solid disengagement without causing a degree of contact material boiling which would cause the level of contact material to rise to the level of the lower edges of the gas collecting members 33. Consequently, the disengaged reactant gas may pass under the gas collector members 33 and be withdrawn therefrom through conduits 34 without sweeping along therewith substantial quantities of contact material particles. The effluent reactant gas then passes through conduit 24 to the product fractionation and recovery system 28. It will be noted that since the total surface area for disengagement of reactant gas from the solid before it enters zones 40 is greater than the horizontal cross sectional area of the contact material column within the vessel 20 thereabove as hereinabove described, it follows that the linear rate of gas flow at the disengaging surfaces is less than the linear rate of gas flow in said column thereabove.

Although the conversion vessel shown in Figures 1 and 2 is of generally square cross sectional area, vessels of other cross sectional shape may be used provided the gas outlet baffling within the lower ends thereof are properly shaped and spaced so as to provide substantially uniform gas removal across the entire vessel cross-section. Thus, in Figure 3 is shown a plan view looking down on a gas outlet section within a circular shaped vessel 45. Supported within the center of the vessel 45 is an inverted conical shaped baffle 46 and spaced concentrically therewith are the inverted annular, angle shaped baffles 47 and 48. These baffles correspond to the angle shaped baffles 29 in Figures 1 and 2. Ring type baffles having sloping sides and suitably shaped gas collector members are positioned below these baffles in similar manner to those shown in Figure 1, but these baffles are not shown in Figure 3 for the purpose of simplifying that drawing. A conduit 49 passes across the vessel 45 through all of the baffling arrangements and has perforations therein at locations under the gas collector channels. Thus effluent gas after disengagement from the solid contact material may pass through conduit 49 and conduits 50 and 51, connected to the opposite ends thereof to the product recovery system.

In order to better understand the operation of the gas disengaging and outlet arrangement, reference should be made to Figure 4 in which is shown two of the baffle arrangements used in the conversion vessel of Figure 1. In Figure 4 we find the angles 29 and the plate baffles therebelow 30, 31 and 32 providing the zones 40 within the column 53 of particle form solid contact material. Also within zones 40 are shown the angle shaped gas collector members 33 and the outlet conduits 34 extending under one end thereof. It will be noted that the baffles 30, 31 and 32, which are located one below the other in the order named, are of progressively decreasing width thereby forming diagonally upwardly sloping passages of progessively decreasing length for gas flow between the column of particle contact material flowing between baffle arrangements and the zones 40 under the baffle arrangements. This is of considerable importance, as will become more apparent from a consideration of the resulting operation which would be obtained if all of these vertically spaced upwardly sloping passages were of equal length. Such an arrangement is shown in Figure 5 wherein 87 represents a part of the column of contact material within the lower end of a conversion vessel and 80 represents angle type baffles and 81, 82 and 83 are upwardly sloping plate baffles thereunder, each of equal length. With this arrangement the length of contact material bed through which gas would be required to flow between some point 86 in the column above the baffling and the zones 40 would be less by way of the passageway between angles 80 and baffles 81 than by way of any of the passageways therebelow. Consequently the gas would tend to flow primarily through the path of least resistance and the linear gas velocity through the passages between angles 80 and baffles 81 would be considerably greater than its velocity through any of the passages therebelow. Thus in the normal operation of a concurrent type converter the gas velocity through the uppermost passages between angles 80 and baffles 81 would be sufficient to cause considerable boiling of the contact material thereby causing an excessive spillage of said material into zones 40 from the upper ends of these passages. This rate of spillage would be greater than the normal rate of contact material withdrawal from the normal surface 85 below the baffling arrangement so as to cause the contact material bed to build up within the zones 40 and up into the gas collector channels 84. This would result in the sweeping of large quantities of contact material from the conversion vessel along with the effluent gases through outlet conduits 34. This would occur even though the total area for gas flow through all the provided means of passage from the column to the zones 40 would be sufficient to handle the gas flow without excessive contact material boiling if the gas flow were properly distributed through all the passages.

Referring now again to Figure 4, line 68 represents the average level within the conversion vessel to which gas must flow downwardly through the contact material column to enter the passageways between angles 29 and baffles 30 and line 69 represents the corresponding level for the passageway between baffles 30 and 31. It has been found that particle form contact material may be pushed horizontally or diagonally upward at relatively high gas velocities which are still below that which would cause substantial turbulence or boiling of the material. At such gas velocities the passages between baffles will become substantially filled with contact material, and since the contact material may spill over into the zones 40 from the upper end of the passageways, the length of the column of contact material in such passageways will depend upon the widths of the plate baffles. Thus if baffles 30 are wider than baffles 31 to such an extent as to provide columns of solid in the uppermost passages sufficiently longer than the columns of contact material in the passages between baffles 30 and 31 as to just compensate for the increased resistance to gas flow caused by the column of contact material between lines 68 and 69, then the resistance to gas flow between a point 54 above the baffling and zones 40 will be substantially equal by way of either of these passages. Moreover, if the lengths of the remaining passages therebelow are likewise progressively decreased in the proper proportion, the resistance to gas flow into zones 40 will be substantially equal by any route so as to provide uniform linear rates of gas flow by any of such routes. Moreover, if the baffles are so spaced as to provide a total gas-solid disengaging surface area, that is, total of surfaces 56, 57, 58 and 55, which is sufficient to limit the gas linear velocity below that at which excessive boiling of the solid material at and near these surfaces will occur, then excessive spillage of contact material into zones 40 from surfaces 56, 57 and 58 will be prevented and the substantial rise of surfaces 55 up into zones 40 will also be prevented.

The collecting members 33 within zones 40 are open to gas flow only at the base thereof so as to prevent entrance thereunder of the small amount of solid contact material spillage into zones 40 from the surfaces 56, 57 and 58. Moreover the swirling motion imparted to that part of the effluent gas disengaged from surfaces 56, 57 and 58 by its downward and then upward flow around the lower edges of the gas collecting members 33 permits a centrifugal separation of any solid spillage falling through zones 40 from the gas. The collecting members 33 should be so positioned that the base thereof is a substantial distance above the contact material surface 55 and the size of the collecting members should be such as to provide sufficient area for gas flow at their bases to limit the gas velocity below that which would carry contact material particles of a size which should be retained in the solid circulation system. The proper collector member size will naturally depend upon the particular gas and solid material involved, as well as upon the desired convertor operating conditions. However, once these factors are set, the proper collector member size required to limit the gas flow, as above specified, may be calculated by methods well known to those skilled in the art.

The gas outlet conduits 34 should be preferably located under the collecting members a substantial distance above the bases thereof. Although these gas outlet conduits have been shown hereinbefore as extending under only one end of the collecting members, outlet conduits may be provided under both ends thereof, if desired. Also perforated conduits extending the length of the collecting members may also be used.

The exact dimensioning and spacing of the gas disengaging and outlet arrangements will naturally depend to a large extent upon a number of variables involved in any particular application. Such variables are the total desired rate of contact material and gas flow, the operating temperature and pressure, the nature of the contact material and of the gaseous reactant and the size and shape of the contact material. Certain broad specifications may be stated, however, which will permit proper design of the baffling arrangements once the variables for any particular application have been set.

The spacing of the baffling arrangements across the conversion vessel cross-section should be such as to leave sufficient passage area between the arrangements for unthrottled flow of the contact material column.

The width of the angles 29 and plate baffles 30, 31 and 32 should be properly adjusted, as shown hereinabove, so as to provide substantially equal resistance to linear gas flow from the column above the baffling to the zones thereunder by way of any of the passages provided therebetween at different levels. These dimensions may be easily calculated from a small amount of data on the difference in pressure drop due to gas flow upwards and downwards through contact material beds and moving columns. Such data may be preferably obtained by a few simple experiments using the particular contact material involved or it may be obtained by calculations.

The vertical spacing of the baffles 29, 30 and 31 should be less than that which would permit the contact material to flow therebetween into the zones 40 and on the other hand, it should be sufficient to provide sufficient area for gas flow from the column of contact material into zones 40 to prevent excessive spillage of contact material into zones 40. In other words, the total spillage into zone 40 of contact material from disengaging surfaces 56, 57 and 58, shown in Figure 4 should not be greater than the maximum rate at which such contact material will be withdrawn downwardly from surface 55 directly under the baffling arrangement. It is with this meaning that the term, excessive spillage of contact material or its equivalent, will also be used in the claiming of this invention. Obviously the maximum rate at which contact material may be withdrawn from surface 55 is mainly dependent upon the downward rate of flow of the contact material column in the convertor which is a rate which must be determined for the particular application for which the invention is to be used.

Generally excessive spillage will occur at and slightly below those gas velocities which correspond to serious boiling of the contact material. For a particle form contact material of 38 pounds per cubic foot density and 0.16 inch average diameter, the linear velocity of hydrocarbons of approximately 90 molecular weight at 925° F. and 10 pounds per square inch pressure required to boil the contact material was found to be 3.0 feet per second calculated on the area of the passageway free of solid.

It should be understood that the invention is not limited to the use of only three plate baffles such as 30, 31 and 32 under each side of each angle 29, nor may as many as three baffles be required for some applications. It will be apparent that the greater the number of these vertically spaced baffles used, the greater is the provided cross-section for gas flow into zones 40. Thus once having settled upon a given suitable baffle spacing, and upon the highest anticipated total gas rate in a specific application, the number of vertically spaced baffles in the baffle arrangements should amount to that which will provide a total gas disengaging surface area sufficient to limit the gas velocity at said disengaging surfaces below that which would cause excessive boiling of the particle form solid material.

The slope with the horizontal of the sides of the angle baffle and the widths of plate baffles thereunder should be preferably between 30° and 70 degrees but less favorable operation may be obtained outside these limits. Also the sides of the angles 29 and the widths of the plate baffles may be of a generally curved shape rather than flat, if desired.

Other modified arrangements of the gas outlet and disengaging baffles are also possible within the scope of this invention. One such modified arrangement is shown in Figure 6, which is a sectional view of a single baffle arrangement in a section of a contact material column 65. This arrangement comprises a covering angle 60 and a number of flat vertically spaced sloping plate baffles 61, 62, 63 and 64 under each side thereof, which together provide a zone 40 from which direct gravity flow of solid is excluded. Within the zone 40 is the angle topped gas collecting channel 66 and the gas outlet conduit 34 thereunder. It will be noted that this arrangement differs from that shown in Figure 4, principally in that the upper ends of the plate baffles 61, 62, 63 and 64 terminate in the same vertical planes under the angle 60 and their lower ends terminate in different planes whereas the reverse was true in the arrangement of Figure 4.

Still another modification is shown in Figure 7 in which an angle topped channel 70 is used to define the space 40 and rows of vertically spaced pipes 71, 72 and 73 of different lengths are connected to the sides of the channel 70 to provide the gas passageway to the zone 40. Within the zone 40 is supported the angle topped collector channel 75 with outlet conduit 34 thereunder.

The same broad specifications regarding baffle spacing, size and arrangement discussed in regards to the arrangement shown in Figure 4 are also applicable to the modified arrangements shown hereinabove.

It will be understood that the gas disengaging and baffle arrangement and the concurrent type operation made possible thereby may also be applied to the contact material regeneration part of a continuous cyclic catalytic hydrocarbon conversion system and that all the modifications of the invention shown herein and the applications thereof have been intended merely as exemplary in character and are in no way intended to limit the scope of the invention except as limited by the following claims.

I claim:

1. An apparatus for contacting gases with moving particle-form solid material comprising: an elongated vessel suitable for confining a substantially-compact downwardly-moving column of particle-form solid material, means to introduce said solid to the upper end of said vessel, means to withdraw said solid from the lower end thereof, means to admit reactant fluid into said vessel, a plurality of spaced baffle means positioned within said vessel to define a plurality of spaced zones from which said column flow is excluded and serving to provide a plurality of upwardly-sloping superposed passages for gas flow from said column into each of said column excluded zones, said passages being of progressively decreasing length the lower their position in said vessel, and means to withdraw gas from each of said column excluded zones defined by said baffle means.

2. Apparatus for hydrocarbon conversion comprising: a vertical vessel defining a confined reaction space, means to feed particle-form solid contact mass material to the top thereof to maintain therein a substantially-compact downwardly-moving column of said solid contact mass material, means to remove said solid from the bottom of said vessel at a controlled rate, means to introduce reactant gas to said vessel adjacent the upper end thereof, a plurality of spaced gas-collecting members within the lower end of said vessel and conduit means associated therewith for withdrawing gas from said collecting members, baffles adjacent said gas-collecting members serving to provide zones surrounding said gas-collecting members from which said column flow is diverted and serving to provide a plurality of upwardly-sloping superposed passages for gas flow from said column to said zones, said passages being of progressively-decreasing length the lower their position in said vessel and being of sufficient total cross-section for gas flow to permit the disengagement of said gas from said solid therein without excessive spillage of said solid from the upper end of said passages into said zones surrounding said gas-collecting members.

3. Apparatus for hydrocarbon conversion comprising a vertical vessel defining a confined reaction space, means to feed particle-form solid contact mass material to the top thereof to maintain therein a substantially-compact downwardly-moving column of said contact mass material, means to remove contact mass material from the bottom thereof, means to introduce reactant thereto adjacent of the top of said column, within said vessel near the lower end thereof a plurality of baffle means serving to define a plurality of spaced zones from which said column flow is excluded and serving to provide a plurality of vertically-spaced upwardly-sloping passages for reactant gas flow from said column into each of said column excluded zones, the resistance to linear gas flow through said contact mass material from any given point immediately above a given column excluded zone to said zone being substantially equal by way of any plurality of vertically-spaced passages to said zone, and the total cross-section for gas flow in said passages being greater than the horizontal cross-sectional area of said vessel, a gas outlet member positioned within each of said zones defined by said baffle means and extending along a substantial portion of the length of said zone, each gas outlet member being adapted to collect gas only along its lower side.

4. Apparatus for hydrocarbon conversion comprising a vertical vessel defining a confined reaction space, means to feed particle-form solid contact mass material to the top thereof to maintain therein a substantially-compact, downwardly-moving column of said contact mass material, means to remove contact mass material from the bottom thereof, means to introduce reactant thereto adjacent the top of said column, within said vessel near the lower end thereof, a plurality of baffle means serving to define a plurality of spaced zones from which said column flow is excluded, an inverted reactant gas outlet trough positioned within each of said zones, conduit means to lead said gases from said vessel in free gaseous communication with said gas outlet troughs; said baffle means being further so arranged as to define in association with each of said zones a plurality of vertically-spaced upwardly-sloping passages for reactant gas flow from said moving column into each of said column excluded zones, the resistance to linear gas flow through said contact mass material from any given point immediately above a given zone to said zone being substantially equal by way of any of the vertically-spaced passages to said zone and the total cross-section for gas flow in said passages being such as to permit disengagement of said gas from said contact material without an amount of contact material spillage from the upper end of said passages into said zones sufficient to build up a level of said contact material under the baffling which would extend up to said trough outlets.

5. An apparatus for contacting gases with a moving particle-form solid material comprising: a vertical vessel suitable for confining a substantially-compact downwardly-moving column of particle-form solid material, an inlet conduit for admitting said particle-form solid within the top of said vessel, an outlet conduit for withdrawing said solid from the bottom thereof, flow-throttling means associated with said outlet conduit, an inlet conduit adjacent the upper end of said vessel for admitting gas above the top of said column of solid therein, a plurality of horizontally-positioned inverted angle-shaped baffles spaced uniformly across the vessel cross-section within the lower end thereof, a plurality of parallel vertically-spaced plate baffles extending substantially the length of said angle-shaped baffles supported below each side of each of said angle-shaped baffles, said plate baffles being placed on a slope with the horizontal as regards their width and the width of each of said baffles being substantially less than that of the one thereabove, the entire baffle arrangement being such as to define a plurality of zones uniformly spaced across the vessel cross-section from which direct gravity flow of said solid material is excluded and into which zones gas may pass through the spaces between baffles and from the solid material surface under each baffle arrangement, inverted angle-shaped gas-collecting members supported within each of said zones and extending substantially the length thereof, said collecting members being so positioned within such zones that the lower edges of their sides terminate above the surface of the solid material under said zones, conduit means associated with each of said gas-collecting members for withdrawing gas from said vessel.

6. An apparatus of the type described for hydrocarbon conversion comprising: a vertical vessel suitable for confining a substantially-compact downwardly-moving column of particle-form solid contact mass material, means to admit said solid adjacent the upper end of said vessel and means to withdraw it from the bottom thereof at a controlled rate, means to introduce reactant gas at reaction conditions adjacent the upper end of said vessel, a row of uniformly-spaced inverted angle-shaped baffles extending lengthwise substantially across said vessel supported within the lower end thereof, a series of parallel vertically-spaced plate baffles extending lengthwise below each side of each of said angle-shaped baffles, said plate baffles being positioned at substantially the same slope with the horizontal as the sides of the angle-shaped baffles thereabove as regards their width and the width of said baffles progressively decreasing the lower their position, the entire baffle arrangement being such as to provide a row of uniformly-spaced zones within the lower end of said vessel from which direct gravity flow of the solid material is excluded and into which the reactant gas may pass after disengaging from said solid in the passages formed between the vertically-spaced baffles and at the solid material surface below each of said zones, the total area of the gas-solid disengaging surfaces thereby provided being substantially greater than the area for free gas flow thereabove in said vessel, an inverted angle-topped gas-collecting channel suspended within each of said zones, each gas-collecting channel having a maximum width and height substantially less than that of the zone in which it is suspended, conduit means associated with each of said gas-collecting channels for withdrawal of gas therefrom.

7. An apparatus according to claim 6 characterized in that the sides of all the baffles in said baffle arrangement and of said gas-collecting channels form an angle with the horizontal greater than 35 degrees and less than 70 degrees.

8. That method of contacting gases with a particle-form solid which comprises: moving said particle-form solid through a confined contacting zone as a substantially-compact column of downwardly-moving solid, introducing gases adjacent the upper end of said column and passing it downwardly therethrough, baffling the solid flow in the lower portion of said column to provide a plurality of spaced apart zones from which said column flow is excluded and to provide in association with each of said zones a plurality of surfaces for disengaging gas from said column, disengaging said gas from said column at said disengaging surfaces and passing it from said surfaces downwardly within said column excluded zones, reversing the direction of flow of said gas in the lower portion of said zones so as to cause settling of entrained solid particles and then withdrawing said gas from said column excluded zones.

9. In a process of the type described a method for treating particle-form solids with a gaseous material comprising: maintaining a substantially-compact confined column of downwardly-flowing particle-form solid, replenishing said column at the upper end thereof, withdrawing solid from the lower end thereof at a controlled rate, introducing gas adjacent the upper end of said ccolumn and passing it longitudinally through said column and concurrently with the flow of said solid, baffling the flow of said gas near the lower end of said column so as to cause it to disengage from said solid at a plurality of surfaces at a plurality of elevational levels, said baffling being such as to cause said gas just prior to its disengagement from said solid to flow in a diagonally-upward direction through a plurality of columns of said solid, said columns progressively decreasing in length the lower their elevational position within said column, and withdrawing said disengaged gas from said vessel.

10. That method for the conversion of hydrocarbons in the presence of a particle form solid contact mass material which comprises: moving the contact mass through a confined reaction zone as a compact column of downwardly flowing particle form solid, passing gaseous hydrocarbons at reaction conditions longitudinally through said column and concurrently with said solid flow, baffling the flow of the gas near the lower end of said column so as to cause it to flow in an upwardly sloping direction through a plurality of relatively short individual columns of said solid formed at a plurality of levels within the lower end of said column, the latter columns progressively decreasing in length the lower their elevational position, disengaging said gas from said solid at the surfaces of said latter columns and withdrawing it from said vessel without substantial entrainment of said solid.

11. In a process of the type described a method for conversion of hydrocarbons in the presence of a particle form solid contact mass material comprising: maintaining a substantially compact confined column of downwardly moving particle form solid contact mass material, replenishing said column at the upper end thereof and withdrawing said solid from the lower end thereof at a controlled rate, introducing reactant gas at reaction conditions adjacent the upper end of said column and passing it longitudinally therethrough concurrently with said solid flow, withdrawing reactant gas through a plurality of uniformly spaced hooded outlets within the lower end of said column while baffling said gas flow prior to its entrance to said outlets so as to provide, prior to the entrance of gas to any given outlet, its disengagement from said solid at a plurality of surfaces at a plurality of levels at all of which disengaging surfaces the linear rate of gas flow is substantially equal and substantially below the linear rate of gas flow in said column thereabove.

12. In a process of the type described a method for the conversion of hydrocarbons in the presence of a particle form solid contact mass material comprising: maintaining a substantially compact confined column of downwardly moving particle form solid contact mass material, replenishing said column at the upper end thereof and withdrawing said solid from the lower end thereof at a controlled rate, introducing reactant gas at reaction conditions adjacent the upper end of said column and passing it longitudinally therethrough concurrently with said solid flow, baffling the reactant gas flow at a plurality of levels within the lower end of said column so as to cause it to flow through a plurality of relatively short vertically spaced upwardly sloping passages which are substantially filled with said solid, the passages being of progressively decreasing length the lower their elevational position within said column and being of sufficient total cross-section for gas flow to permit the disengagement of gas from the surface of the solid therein without excessive spill-over of said solid from the upper ends of said passages, withdrawing the disengaged gas from said column through a plurality of hooded outlets, each of which outlets is associated with a plurality of said vertically spaced upwardly sloping passages.

13. That method for the conversion of hydrocarbons in the presence of a particle form solid contact mass material which comprises: moving the contact mass through a confined reaction zone as a compact column of downwardly flowing particle form solid, passing gaseous reactants at reaction conditions longitudinally through said column and concurrently with said solid flow, baffling the reactant gas flow at a plurality of locations within the lower end of said column so as to cause it to flow through a plurality of relatively short upwardly sloping passages at a plurality of levels, said passages being substantially filled with said solid and being of progressively decreasing length the lower their elevational position within said column and being sufficient in number and cross-sectional area to provide a total area for gas-solid disengagement at the surfaces of said solid in said passages substantially greater than the area for free gas flow in said column thereabove, disengaging the gas from the surfaces of the solid in said passages, passing said disengaged gas by circuitous route under the lower edges of a hooded outlet from which said column is excluded by said baffling and withdrawing the gas from said outlet.

14. That method for the conversion of hydrocarbons in the presence of a particle form solid contact mass material which comprises: moving the contact mass through a confined reaction zone as a compact column of downwardly flowing particle form solid, passing reactant hydrocarbon gas at reaction conditions longitudinally through said column and concurrently with said solid flow, withdrawing reactant gas through a plurality of uniformly spaced hooded outlets within the lower end of said column, while baffling said gas and solid flow adjacent each of said outlets so as to divert said column below the lower edges of said hooded outlets and so as to cause said gas, prior to its flow to any given outlet, to flow in a diagonally upward direction through a plurality of solid filled passages at a plurality of spaced levels, the passages being of progressively shorter length the lower their elevational position and being of sufficient total cross sectional area as to permit the disengagement of the gas from the surfaces of the solid therein without causing an amount of solid spill-over which would cause the solid level to build up to the lower edges of said hooded outlets.

15. That method of contacting gases with a particle-form solid which comprises: moving said particle-form solid through a confined contacting zone as a substantially-compact column of downwardly-moving solid, introducing gas adjacent the upper end of said column and passing it downwardly therethrough, withdrawing said gas through a plurality of hooded outlets within the lower end of said column while accomplishing the uniform disengagement of said gas from said solid prior to the gas entrance to any given outlet by directing gas flow through a plurality of upwardly sloping, relatively short, baffle confined columns of said solid, spaced at vertical intervals immediately adjacent the given outlet, the latter columns progressively decreasing in length the lower their elevational position, and disengaging the gas from said solid at the surfaces of said latter columns.

16. In a process wherein a hydrocarbon reactant material is passed downwardly within a substantially compact column of downwardly moving particle-form contact material in a confined conversion zone to convert said reactant material to gaseous hydrocarbon products that method for withdrawing gaseous products from the column of contact material in said conversion zone which method comprises: withdrawing said gaseous products from said column through a plurality of uniformly spaced apart outlets while baffling the gas flow within said column prior to its entrance to said outlets so as to provide prior to the entrance of gas to any given outlet its disengagement from said solid at a plurality of surfaces at a plurality of levels, disengaging said gas from said solid at all of said surfaces at a linear rate of gas flow substantially below the linear rate of gas flow in said column thereabove.

LOUIS P. EVANS.

REFERENCES CITED

The following references are of record in the file of this patent:

UNITED STATES PATENTS

| Number | Name | Date |
|---|---|---|
| 558,508 | Metcalf | Apr. 21, 1896 |
| 1,174,464 | Agnew | Mar. 7, 1916 |
| 1,394,269 | Bourdet | Oct. 18, 1921 |
| 1,702,311 | Pantenburg | Feb. 19, 1929 |
| 2,302,328 | Kelly | Nov. 17, 1942 |
| 2,338,573 | Creelman | Jan. 4, 1944 |
| 2,240,347 | Page et al. | Apr. 29, 1941 |
| 2,246,654 | Arveson | June 24, 1941 |
| 2,298,593 | Rubin et al. | Oct. 13, 1942 |
| 964,719 | Wegescheidt | July 19, 1910 |
| 1,836,301 | Bechthold | Dec. 15, 1931 |